United States Patent
Kim

(10) Patent No.: US 8,090,458 B2
(45) Date of Patent: Jan. 3, 2012

(54) METHOD OF CALCULATING TEMPORAL INFORMATION OF FRAME-BASED AUDIO STREAM DATA

(75) Inventor: Hun Joong Kim, Seoul (KR)

(73) Assignee: Core Logic Inc., Kangnam-Gu (KR)

( * ) Notice: Subject to any disclaimer, the term of this patent is extended or adjusted under 35 U.S.C. 154(b) by 1225 days.

(21) Appl. No.: 11/470,791

(22) Filed: Sep. 7, 2006

(65) Prior Publication Data
US 2007/0116435 A1 May 24, 2007

(30) Foreign Application Priority Data
Sep. 9, 2005 (KR) .................. 10-2005-0084131

(51) Int. Cl.
*G06F 17/00* (2006.01)
*G04F 10/00* (2006.01)
(52) U.S. Cl. .................. 700/94; 702/176
(58) Field of Classification Search .......... 700/94, 700/306; 702/176; 968/849
See application file for complete search history.

(56) References Cited

U.S. PATENT DOCUMENTS 7,283,880 B2 * 10/2007 Dick .................. 700/94

2005/0015570 A1 * 1/2005 Akiyoshi .................. 711/220
2005/0111493 A1 * 5/2005 Han et al. .................. 370/509

OTHER PUBLICATIONS

Windszus, Konrad, "MPEG Audio Fram Header", archived online on Oct. 16, 2004, The Web Archive (http://web.archive.org), http://web.archive.org/web/20041016011726/www.codeproject.com/audio/MPEGAudioInfo.asp.*
Federal Standard 1037C, "Sampling Rate", Aug. 7, 1996, http://www.its.bldrdoc.gov/fs-1037/, http://www.its.bldrdoc.gov/fs-1037/dir-032/_4673.htm.*

* cited by examiner

*Primary Examiner* — Davetta W Goins
*Assistant Examiner* — Daniel Sellers
(74) *Attorney, Agent, or Firm* — The Nath Law Group; Joshua B. Goldberg

(57) ABSTRACT

The present invention relates to a method of calculating temporal information of frame-based audio stream data, and more particularly, to a method of calculating temporal information of frame-based audio stream data, in which it can calculate time related information depending on the playback of stream data even when bitrate or timetable information is not included in header information when audio or voice stream data consisting of a frame format are played back. Audio and voice stream data applied at this time includes stream data of a type in which several frames form one bit stream block as well as stream data constructed on a frame basis.

5 Claims, 3 Drawing Sheets

METHOD OF CALCULATING TEMPORAL INFORMATION OF FRAME-BASED AUDIO STREAM DATA

BACKGROUND OF THE INVENTION

1. Field of the Invention

The present invention relates to a method of calculating temporal information of frame-based audio stream data, and more particularly, to a method of calculating temporal information of frame-based audio stream data, in which time related information depending on the playback of stream data can be calculated even when bitrate or timetable information is not included in header information when audio or voice stream data having a frame format are played back.

2. Background of the Related Art

An audio signal encoded as a digital signal is stored in digital storage media such as CD, DVD and MP3 player. The digital signal temporarily stored in a buffer included in a playback apparatus is decoded into an audio signal by a decoder and is then output.

Recently, as audio storage media are developed and various types of players are commercialized, a variety of methods of selectively playing back and repeating the signal included in the storage media and performing fast forward and fast rewind on the signal have been disclosed.

In the related arts, a playback time of the whole file, a temporal location of a specific part, a current playback time and the like are calculated using bitrate information included in header information of a coded digital signal. Information on a playback state is provided to a user by displaying back them on a Liquid Crystal Display (LCD). That is, in the case where bitrate information is included in the frame header such as a CBR (Constant Bitrate)-encoded MP3 file, a total playback time of an audio file can be easily calculated using bitrate information and file size information.

Furthermore, even in the case of a VBR (Variable Bitrate)-encoded file, a total playback time can be easily calculated using information on a total frame count, a playback time or the like, which is included in an additional header, if any.

However, in the case of an audio stream whose size is varied every frame or a frame-based audio stream not having bitrate information, etc. such as VBR not having additional header information or a packet stream, such as a total frame count and a timetable, which can calculate temporal information, it is difficult to calculate an accurate playback time.

In this case, to calculate information on the playback time, a total frame count constituting the audio stream is calculated by loading the entire files before playback.

FIG. 1 is a block diagram showing the structure of a timetable writing system in the related art. According to the related art, when an audio data file is streamed from a data storage unit 32 through a buffer memory or a cyclic buffer 25, a microcontroller or a timekeeper 22 calculates an elapsing playback time (T1) for each segment of audio data. A DSP memory or a linear buffer 11 receive an audio data stream from the cyclic buffer 25, and the linear buffer 11 includes a time length (ΔT) of the audio data. To calculate and display an elapsing playback time (T2) which is input from the linear buffer 11 to a decoding DSP decoder 12, the time keeper 11 monitors the time length (ΔT) of the audio data included in the linear buffer 11 based on the elapsing playback time (T1) of the audio data output from the cyclic buffer 25. Therefore, the elapsing playback time (T2) designates an elapsing playback time of an audio data file for audio data that are currently decoded by the DSP decoder 12.

However, to load the entire files before the audio stream is played back as described above, an additional data loading time is required and additional power is consumed. Therefore, a standby time necessary for playback is lengthened and power consumption in a compact player is increased. Therefore, there is a disadvantage in that an available battery time is reduced. And, in a case packet stream, such as PD stream or DMB stream, it is hard to get the information of playback time and time control because it is difficult to estimate total stream size.

SUMMARY OF THE INVENTION

Accordingly, the present invention has been made in view of the above problems, and it is an object of the present invention to provide a method of calculating temporal information of a frame-based audio stream data, in which information on an accurate playback time can be calculated using a total frame count and a file size if stream data are constructed on a frame basis although information on a bitrate or playback time is not included in the header.

Another object of the present invention is to provide a method of calculating temporal information of a frame-based audio stream data, in which various temporal information can be calculated while playing back stream data without the need for an additional loading time in order to find temporal information of frame-based audio stream data.

Further another object of the present invention is to provide a method of calculating temporal information of frame-based audio, packet stream and voice stream data, in which a temporal location within a bit stream, which is necessary for fast forward, fast rewind and repeat of stream data, can be found without additional bitrate information under an environment in which an additional timetable cannot be constructed or employed or an environment in which a storage medium, such as a memory in which a bit stream is stored, etc. cannot be directly accessed.

To achieve the above objects, according to an aspect of the present invention, there is provided a method of calculating temporal information of frame-based audio stream data in a system that plays back the audio stream data, the method including the steps of if audio stream data encoded as a frame format are input to a buffer, calculating a decoding frame count per unit time, calculating a data size per frame of the audio stream data stored in the buffer, and calculating a total playback time of the audio stream data by dividing the entire size of the audio stream data by a multiplication of the decoding frame count per unit time and the data size per frame.

According to another aspect of the present invention, there is provided a method of calculating temporal information of frame-based audio stream data in a system that plays back the audio stream data, the method including the steps of if audio stream data coded as a frame-based format are input to a buffer, calculating a decoding frame count per unit time, updating a playback frame count of the audio stream data that have been played back by the decoding of the system and storing the updated playback frame count, and calculating a current playback time of the audio stream data that are in progress by dividing the playback frame count by the decoding frame count per unit time.

The step of calculating the decoding frame count per unit time may comprise the steps of calculating a sampling rate (i.e., a PCM sample number/sec) that is decoded into last PCM (Pulse Code Modulation) data per unit time and output, and calculating the decoding frame count per unit time by dividing the sampling rate by the decoded PCM sample data number of a frame.

The data size (in bytes) per frame may be calculated by dividing the size of the whole audio stream data stored in the buffer by a frame count of audio stream data input to the buffer.

According to further another aspect of the present invention, there is provided a method of calculating temporal information of frame-based audio stream data in a system that plays back the audio stream data, the method including the steps of if audio stream data coded as a frame format are input to a buffer, calculating a data size per frame of audio stream data stored in the buffer, calculating a total frame count by dividing a total size of the audio stream data by the data size per frame, and calculating a total playback time of the audio stream data by dividing the total frame count by a decoding frame count per unit time.

According to another aspect of the present invention, there is provided a method of calculating temporal information of frame-based audio stream data in a system that plays back the audio stream data, the method including the steps of if stream data coded as a frame format are input to a buffer, calculating a stream data size per unit time by multiplying a decoding frame count per unit time and a data size per frame of the stream data stored in the buffer, if a moving signal is input while the audio stream is played back, calculating a stream data size to be moved by multiplying an input moving time and the stream data size per unit time, calculating a buffer input data size by accumulating the stream data size input to the buffer, calculating a decoded buffer input data size indicating the size of stream data that have been decoded and played back, of the stream data stored in the buffer, if the moving signal is a forward moving signal, calculating information on a location at which playback will begin by adding a temporal location that is currently played back and the size of the stream data to be moved to the audio stream data, and if the moving signal is a rewind moving signal, calculating information on a location at which playback will begin by subtracting a temporal location that is currently played back and the size of the stream data to be moved from the audio stream data.

The method may further include the step of finding a current playback time of a new location by adding a current playback time and the moving time.

The temporal location that is currently played back may be calculated by subtracting a maximum packet size from the buffer input data size and then adding the decoded buffer input data size to the buffer input data size.

According to another aspect of the present invention, there is provided a method of calculating temporal information of frame-based audio stream data in a system that plays back the audio stream data, the method including the steps of if a repeat start signal is input while stream data input to a buffer are played back, deciding a current playback frame of the stream data input to the buffer as a repeat start point frame, and storing a frame count accumulated up to a current playback frame as a repeat time point frame count, if a repeat end point signal is input, deciding a current playback frame at the moment when the repeat end point signal is input as a repeat end point frame count and storing the decided current playback frame, and generating a repeat flag and storing the generated repeat flag, and repeating the playback of the stream data from the repeat time point frame count to the repeat end point frame count and updating the repeat flag whenever the repeat playback is completed.

The method may further include the step of if the repeat end point signal is input, deleting information on the repeat time point frame count and the repeat end point frame count.

BRIEF DESCRIPTION OF THE DRAWINGS

Further objects and advantages of the invention can be more fully understood from the following detailed description taken in conjunction with the accompanying drawings in which.

DETAILED DESCRIPTION OF THE PREFERRED EMBODIMENT

Figure 1:
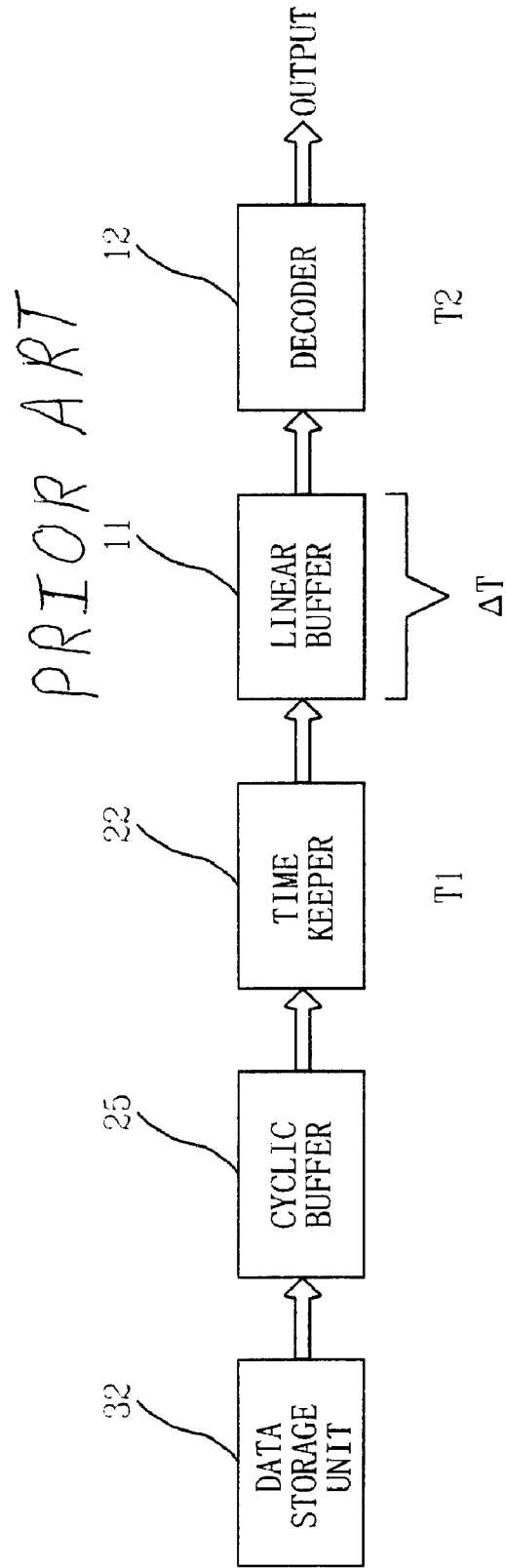
FIG. 1 is a block diagram showing the structure of a timetable writing system in the related art.

The present invention will now be described in detail in connection with preferred embodiments with reference to the accompanying drawings in which like reference numerals are used to identify the same or similar parts.

Figure 2:
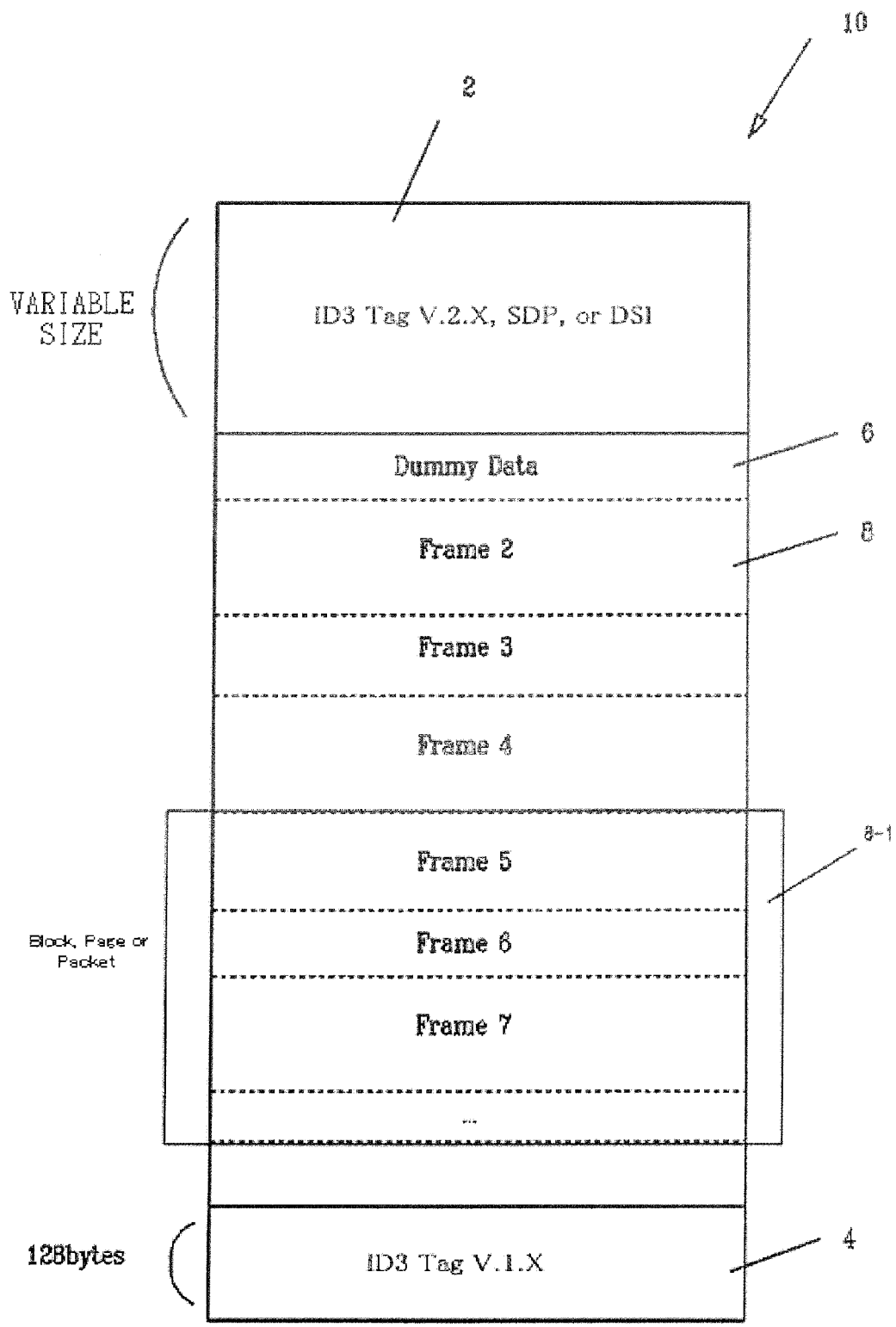
FIG. 2 is a block diagram showing a frame-based audio stream data format.
Figure 3:
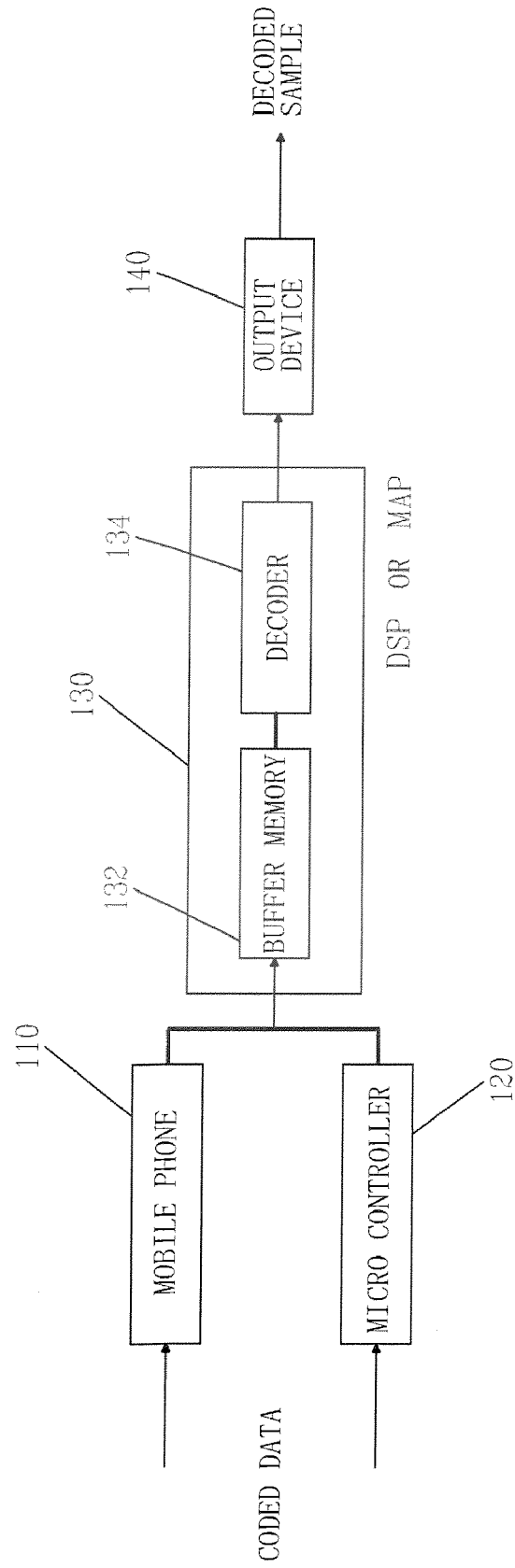
FIG. 3 is a block diagram showing the structure of a temporal information calculation system according to an embodiment of the present invention.

FIG. 2 is a block diagram showing a frame-based audio stream data format and FIG. 3 is a block diagram showing the structure of a temporal information calculation system according to an embodiment of the present invention.

Referring to FIG. 2, stream data 10 include ID3 tags 2, 4 and data 6, 8 that are coded on a frame basis. The stream data 10 are transmitted from a data storage unit of a mobile phone 110 or a microcontroller 120 to a buffer memory 132, which is built in Hera, a Digital Signal Processor (DSP) or a Multimedia Application Processor (MAP) 130, and are then decoded into an audio signal by a decoder 134.

Detailed information on a corresponding music is stored in the ID3 tags 2, 4 located at the head portion and tail portion of the stream data 10. The detailed information may include a title, a writer, a music channel and the like. The ID3 tag V.1.X 4 has a fixed size of 128 bytes, whereas the ID3 tag V.2.X 2 has a variable block size. The ID3 tag V.2.X 2 is different from the ID3 tag V.1.X 4 in that it can store information such as images or the words of a song, The ID3 tags 2, 4 may not be included in the stream data 10, in some cases. In FIG. 2, in a case packet streaming data, such as PD stream or DMB stream, the ID3 tag V.2.X 2 may be DSI (decoding specific information) or SDP(session description packet) region which includes basic information for decoding the stream data.

In the stream data 10, additional data 6 having a different purpose from that of the stream data 10 may exist at the front and rear of the stream or between frames, in some cases. The stream data 10 can consist of a single frame-based 8 and can consist of a block in which several frames are bundled or a page unit (8-1). The data size of each frame may be constant or variable. The present invention can be applied to both a case where the data size of a frame is constant and a case where the data size of a frame is variable.

Stream data to which the present invention can be applied refer to the entire data having a frame-based structure. More particularly, the stream data may include the following cases.

☐ A case where bitrate information is included in the frame header
  :MP1, MP2, MP3 and so on
☐ A case where bitrate information is not included in the frame header
  :AAC (Advanced Audio Coder), ADTS, general voice stream
☐ A case where a block consists of several frames :Real Audio Format, Ogg, WMA (Windows Media Audio) and so on ☐ A case where stream data is constructed on a frame basis without including the frame header
:MP4 Audio, 3GPP file format, Quick Time format, etc.

☐ A frame-based file format not having additional Xing. Vbri headers in order to calculate a total playback time.

☐ A file format not having a timetable for fast forward (FF), fast rewind (FR), seeking, repeat and playback time display.

⑦ A case where packet stream comprises of several frames, for example, PD stream or DMB stream.

The calculation method of the present invention can be applied if a data format consists of a frame basis although temporal information of the stream data 10 is not included in header information.

In embodiments below, the method of calculating temporal information of the stream data 10 will be described on a case basis.

Method of Calculating Playback Time When Bitrate Information does not Exist

To calculate a total or current playback time when the data size is varied every frame or there is no bitrate information, the bitrate has to be calculated based on a frame count or a data size.

☐ Frame-based audio stream data include information on number of PCM (Pulse Code Modulation) data in which a compression bit stream is decoded every frame and then output. If a sampling rate for outputting final PCM data is divided by a PCM sample data number per frame, the frame count of the stream data 10, which has to be decoded by the decoder 134 per unit time.

$$\text{Decoding frame count per unit time}\left[\frac{\text{frame}}{\text{sec}}\right] \frac{\text{Sampling rate}}{\text{PCM sample data number per frame}} = \tag{1}$$

$$\frac{n \times \text{PCM samples}}{\text{sec}} \bigg/ \frac{\text{PCM samples}}{\text{frame}} = n\left[\frac{\text{frame}}{\text{sec}}\right]$$

The above calculation can also be applied to stream data in which several frames form one block (8-1) in Real Audio, Ogg and WMA.

☐ The frame count of the stream data 10, which are transferred from the mobile phone 110 or the microcontroller 120 to the buffer memory 132, is counted and recorded. A data size to be processed per frame is calculated using the counted frame count.

$$\text{Data size per frame}\left[\frac{\text{byte}}{\text{frame}}\right] = \frac{\text{total bytes in buffer}}{\text{frame count in buffer}} \tag{2}$$

$$= \frac{\sum_{j=0}^{\text{condA}} m_j}{\sum_{j=0}^{\text{condA}} j}, \left(\text{condA}: \sum_{j=0} m_j \le P_i\right)$$

$$= m\left[\frac{\text{byte}}{\text{frame}}\right]$$

Assuming that the data transfer unit from the mobile phone 110 or the microcontroller 120 to the buffer memory 132 is a packet, $P_i$ refers to a data size to be transferred from a predetermined $i^{th}$ packet, and m is variable every packet in the case of the VBR.

The size of the stream data 10 to be processed in the decoder 134 can be calculated using the calculation result.

$$\text{Stream data size per unit time}\left[\frac{\text{byte}}{\text{sec}}\right] = \tag{3}$$

$$\text{Data size per frame} \times \text{Decoding frame count per unit time} =$$

$$m\left[\frac{\text{byte}}{\text{frame}}\right] \times n\left[\frac{\text{frame}}{\text{sec}}\right] = m \times n\left[\frac{\text{byte}}{\text{sec}}\right]$$

☐ A total playback time of the stream data can be found by dividing a total stream data size into a stream data size per unit time.

$$\text{Total playback time[sec]} = \frac{\text{Total audio stream size}}{\text{Audio stream size per unit time}} \tag{4}$$

$$= \frac{Z[\text{byte}]}{m \times n\left[\frac{\text{byte}}{\text{sec}}\right]} = \frac{Z}{m \times n}[\text{sec}]$$

☐ Meanwhile, a current playback time of an audio stream that is being played back, of total stream data, can be found. To this end, a playback frame count, which is decoded by the decoder 134 every frame and output by the output device 140, is stored.

$$\text{Current playback time } T_c[\text{sec}] = \tag{5}$$

$$\frac{\text{Playback frame count}}{\text{Decoding frame count per unit time}} = \frac{\sum_{h=0}^{C} h[\text{frame}]}{n\left[\frac{\text{frame}}{\text{sec}}\right]} = \frac{\sum_{h=0}^{C} h}{n}[\text{sec}]$$

☐ The temporal information calculated as described above can be calculated on a bitrate basis. That is, since a stream data size per unit time is calculated on a byte basis, it can be converted into a bit unit by multiplying it by 8.

$$\text{Data size per frame}\left[\frac{\text{bit}}{\text{frame}}\right] = \frac{\text{total bytes in buffer} \times 8}{\text{frame count in buffer}} \tag{6}$$

$$= m \times 8\left[\frac{\text{bit}}{\text{frame}}\right]$$

$$\text{Total playback time } T[\text{sec}] = \frac{Z[\text{byte}] \times 8}{m \times n \times 8\left[\frac{\text{byte}}{\text{sec}}\right]} \tag{7}$$

$$= \frac{Z}{m \times n}[\text{sec}]$$

Method of Calculating Playback Time Where There is Information on Total Frame Count In the case where information on a total frame count of the audio stream data 10 is included in a CBR mode or additional header information, a total playback time, etc. can be simply found using the information.

☐ A total frame count of the stream data can be found by dividing the entire file size by the data size per frame, which is found in Equation 2. In the case of the VBR mode in which additional information does not exist, "m" can have a mean value of transmission packets.

$$\text{Total frame[frame]} = \frac{\text{total file size}}{\text{data size per frame}} \quad (8)$$

$$= \frac{Z[\text{byte}]}{m\left[\frac{\text{byte}}{\text{frame}}\right]}$$

$$= \frac{Z}{m}[\text{frame}]$$

☐ Furthermore, the total playback time can be found by dividing the total frame count by the decoding frame count per unit time, which is found in Equation 1.

$$\text{Total playback time } T[\text{sec}] = \quad (9)$$

$$\frac{\text{Total frame count}}{\text{Decoding frame count per unit time}} = \frac{\frac{Z}{m}[\text{frame}]}{n\left[\frac{\text{frame}}{\text{sec}}\right]} = \frac{Z}{ngm}[\text{sec}]$$

Method of Deciding Playback Location in the Case of Fast Forward While Playing Back Audio Stream

A temporal information calculation method for playing back the audio stream data 10 after moving to a predetermined location in the case where a fast forward signal is input in order to move the audio stream data 10 forward to a specific location while playing back the audio stream data 10 will be described below.

In the case where a timetable is included in additional header information such as Xing or Vbri or a case where a timetable is created by loading the entire files as in the related art, a new playback location can be decided using the timetable, However a new method has to be applied to a general format not including additional information must.

A method of loading the entire files once through the DSP or microcontroller 130 before the audio stream data are decoded so as to write a timetable of the stream data 10 to be moved can be applied. However, an additional table storage space for each file or stream is required and a process necessary to load the entire files and to generate a table, as described above, must be performed. Therefore, a time and power are consumed.

A method in which an additional process is not required from a standpoint that a decoding point is moved to an arbitrary offset location within the audio stream will be described. A method of calculating an offset location corresponding to a playback time location in the case where a memory space, etc. in which the stream data 10 are stored cannot be directly accessed by the DSP or MAP 130 and only data information transmitted from the mobile phone 110 or the microcontroller 120 to the buffer memory 132 must be employed will also be described.

☐ If a time scale value is input by a user through a user interface, a stream data size (playback offset) to be moved is found using the time scale value and the stream data size per unit time, which is found in Equation 3.

$$\text{Stream data size to be moved[byte]} = \quad (10)$$

$$\text{Stream data size per unit time} \times \text{Moving time} =$$

$$ngm\left[\frac{\text{byte}}{\text{sec}}\right] \times p[\text{sec}] = ngmgp[\text{byte}]$$

☐ The size (buffer copy size) of the stream data, which are input from the mobile phone 110 or the microcontroller 120 to the buffer memory 132 is continuously updated and recorded therein. The size of the stream data is a size of data, which are copied from the mobile phone 110 or the microcontroller 120 to the buffer memory 132 in order to perform a decoding process. The size of the stream data is accumulated whenever it is copied to the buffer memory 132. The size of the stream data includes a case where a copied size is fixed or variable.

☐ A relative offset on which decoding is performed within a corresponding buffer memory 132 or a decoded frame size is updated within the DSP or MAP 130 whenever every frame is decoded. The value is reset whenever new data are copied from the mobile phone 110 or the microcontroller 120. That is, the value indicates a relative location of a frame that is currently decoded, of the stream data stored in the buffer memory 132.

☐ A current playback location (frame start) in the stream data 10 is calculated using the accumulated buffer data size (buffer copy size) and a decoded data size within the buffer (relative offset in buffer).

$$\text{Current playback location } O_c[\text{byte}] = \quad (11)$$

$$\text{Accumulated buffer page size} -$$

$$(\text{Maximum pack size} - \text{Decoded data size in buffer}) =$$

$$\sum_{i=0}^{k} P_i - (P_k - \Delta P_k)[\text{byte}]$$

The maximum packet size refers to the maximum size of a data packet that can be copied from the mobile phone 110 or the microcontroller 120 to the buffer memory 132 at once.

☐ A location (new frame start) input by a user is decided by a current play back location and a stream data size to be moved, which is found in Equation 10.

$$\frac{\text{Location to begin}}{\text{upon forward}(O_f[\text{byte}])} = \frac{\text{Current playback location} +}{\text{Stream data size to be moved}} \quad (12)$$

$$= O_c[\text{byte}] + ngmgp[\text{byte}]$$

$$= (O_c + ngmgp)[\text{byte}]$$

☐ Meanwhile, a time where the data are being played back at a location that will be newly moved can be found by increasing a moving time from a current playback time right before forward moving.

Playback time of new location=Current playback time
right before forward move+Moving time (13)

As in the VBR mode, to calculate an accurate playback time for a decoding result every frame including a case where a variable size per frame is included, a playback time at a new location can be calculated by increasing the playback frame count in Equation 5 using the decoding frame count per unit time of Equation 1 and a time where moving will begin, which is input by a user.

$$\begin{aligned}\text{Playback frame count of} \\ \text{new location [frame]}\end{aligned} &= \begin{aligned}\text{Current playback frame count} + \\ \text{Decoding frame count per unit} \\ \text{time } X \text{ moving time} +\end{aligned} \quad (13\text{-}1)$$

$$= \sum_{h=0}^{c} h \text{ [frame]} + \left( \begin{array}{c} n \text{ [frame/sec]} \times \\ p \text{ [sec]} \end{array} \right)$$

$$= \left( \sum_{h=0}^{c} h + ngp \right) \text{[frame]}$$

$$\begin{aligned}\text{Playback time of} \\ \text{new location } T_f \text{ [sec]}\end{aligned} = \frac{\text{Playback frame count of new location}}{\text{Decoding frame count per unit time}} \quad (13\text{-}2)$$

$$= \frac{\left( \sum_{h=0}^{C} h + ngp \right) \text{[frame]}}{n \text{[frame/sec]}}$$

$$= \frac{\left( \sum_{h=0}^{C} h + ngp \right)}{n} \text{[sec]}$$

Method of Deciding Playback Location in the Case of Fast Rewind While Playing Back Audio Stream In the case where a fast rewind signal is input in the same manner as fast forward, a new playback location can be found in the same method as the aforementioned algorithm.

In the case of fast rewind, a new location is found by rewinding the location of the stream data contrary to Equation 12.

$$\begin{aligned}\text{Location to begin} \\ \text{rewind}(O_r[\text{byte}])\end{aligned} = \begin{aligned}\text{Current playback location} - \\ \text{Stream data size to be moved}\end{aligned} \quad (14)$$

$$= O_C \text{ [byte]} - ngmgp \text{ [byte]}$$

$$= O_C - ngmgp \text{ [byte]}$$

Furthermore, the playback time at the rewind location can be calculated by Equation 13-2.

$$\begin{aligned}\text{Playback time of} \\ \text{new location } T_f \text{ [sec]}\end{aligned} = \frac{\left( \sum_{h=0}^{c} h - ngp \right) \text{[frame]}}{n \text{[frame/sec]}} \quad (15)$$

$$= \frac{\left( \sum_{h=0}^{C} h - ngp \right)}{n} \text{[sec]}$$

Method of Deciding Playback Location in the Case of Random Playback or Seeking While Playing Back Audio Stream Even in the case where playback randomly resumes at a predetermined location or a specific temporal location is sought while playing back stream data, a combination of the fast forward algorithm and the fast rewind algorithm can be used.

That is, the forward or rewind is not performed based on a specific moving time (time scale) value input through the user interface, but is performed using a moving time value randomly generated by a controller (not shown).

Method of Deciding Playback Period in the Case of Period Repeat Playback While Playing Back Audio Stream If a repeat signal for a specific period is input through the user interface, a repeat start point and a repeat end point are found and temporal information of each point is calculated. Therefore, the method of deciding a playback period can be implemented using the fast forward method and the fast rewind method after each repeat start point and each repeat end point are calculated and stored.

☐ If the repeat playback signal is input through the user interface, a location (frame start) that is being decoded in a file or stream within the buffer memory 132 is stored as a repeat start point location (a repeat start point A) and is then stored in an additional memory as in Equation 11.

$$\begin{aligned}\text{Repeat time point} \\ \text{location}(O_A[\text{byte}])\end{aligned} = \text{Current playback location }(O_C[\text{byte}]) \quad (16)$$

☐ To restore a playback time at a current location when the repeat resumes, current frame count information is backed up and then stored as frame count information (frame count repeat start) at a repeat start point and the playback resumes.

☐ If the repeat playback signal is again input through the user interface, a location (frame start) where the data are currently decoded in a file or stream within the buffer memory 132 is stored as a repeat end point location (a repeat end point B) and then stored in the memory.

$$\begin{aligned}\text{Repeat time point} \\ \text{location}(O_B[\text{byte}])\end{aligned} = \text{Current playback location }(O_{C \to B}[\text{byte}]) \quad (17)$$

In general, the repeat start point and the repeat end point are respectively designated whenever a repeat playback button is pressed. However, in a system having an additional repeat start point and a repeat end point button, a start point and an end point will be designated by the input of each button. It is to be understood that the present invention is applied to the above case.

If the repeat end point location is decided, a flag informing that the repeat playback has been set is set to 1.

☐ If the repeat playback flag is set, an offset value ($O_c$) of a playback location (a frame start) that is being played back is checked whenever a frame is decoded. That is, whether a frame has proceeded as much as a difference (a repeat end offset) between the repeat start point frame and the repeat end point frame from the frame of the repeat start point is determined every frame.

If the stream data frame count played back from the repeat start point frame exceeds the repeat end offset, data for the repeat start point frame that has been backed up are called and are then moved up to the repeat start point using the above-described method. The repeat flag is then increased one by one. What times is the current repeat is stored and the playback begins at the repeat start point.

The repeat playback continues until a release signal of the repeat flag is input through the user interface.

The present invention has an advantage in that playback time information of stream data can be easily calculated without additional loading or writing a timetable although temporal information is not included in audio stream data. Furthermore, access can be controlled by calculating an offset within stream data corresponding to a playback time location under an environment in which the DSP or MAP 130 cannot directly gain access to a memory space, etc. in which the stream data 10 are stored and only data information transmitted from the mobile phone 110 or the microcontroller 120 to the buffer memory 132 must be employed.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method of calculating temporal information of frame-based audio stream data in a system that plays back the audio stream data in case that bit rate information is not included in a frame header, the method comprising the steps of:
   calculating, by a processor, a decoding frame count per unit time, when the audio stream data encoded as a frame format are input to a buffer;
   counting, by the processor, a frame count of the audio stream data input to the buffer;
   calculating, by the processor, a data size per frame of the audio stream data stored in the buffer using the frame count of the audio stream data; and
   calculating, by the processor, a total playback time of the audio stream data by dividing the entire size of the audio stream data by a multiplication of the decoding frame count per unit time and the data size per frame,
   wherein the data size per frame is variable.

2. The method as claimed in claim 1, wherein the step of calculating the decoding frame count per unit time comprises the steps of:
   calculating, by the processor, a sampling rate (i.e., a number of PCM sample numbers) that are sampled per unit time and are output; and
   calculating, by the processor, the decoding frame count per unit time by dividing the sampling rate by PCM sample data number per frame.

3. The method as claimed in claim 2, wherein the audio stream data includes first data and additional data having a different purpose than the first data, the additional data existing at a front and at a rear of each frame making up the audio stream data.

4. The method as claimed in claim 1, wherein the data size per frame is calculated by dividing the entire size of the audio stream data stored in the buffer by the frame count of the audio stream data input to the buffer.

5. The method as claimed in claim 1, wherein the audio stream data includes first data and additional data having a different purpose than the first data, the additional data existing at a front and at a rear of each frame making up the audio stream data.

* * * * *